Sept. 16, 1958 S. T. FRY 2,852,628
COMMUTATOR DEVICE
Filed May 29, 1957 3 Sheets-Sheet 1
Fig.1.
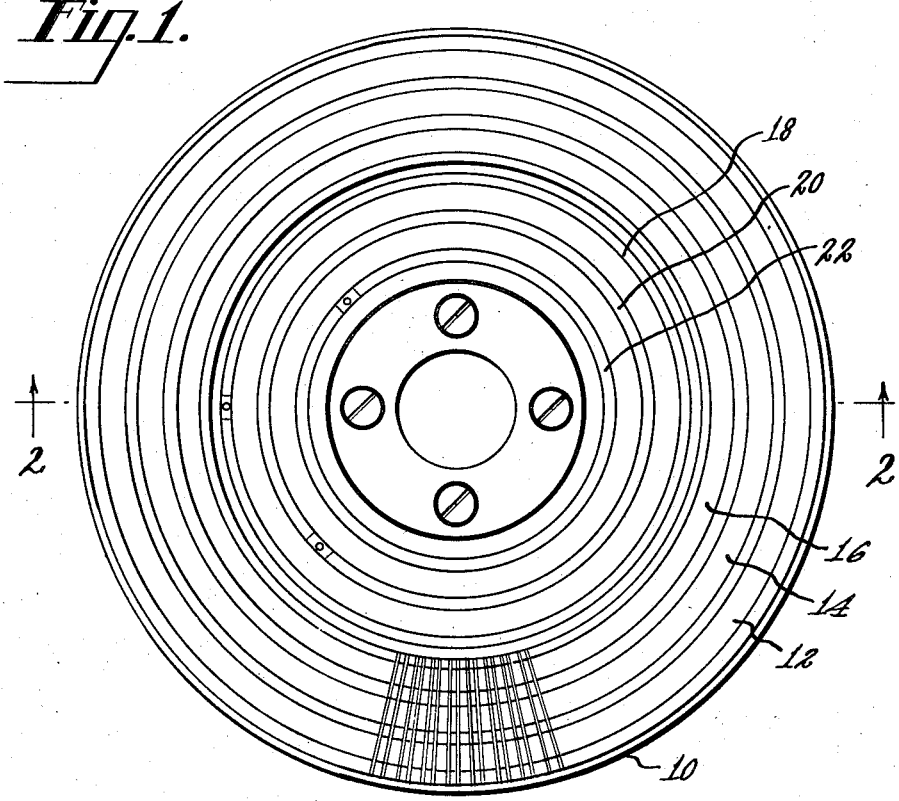
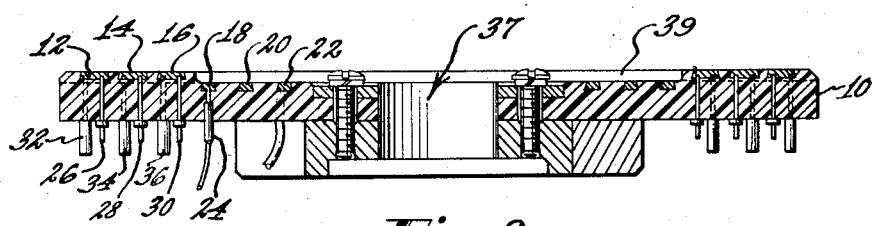
Fig.2.
INVENTOR.
SEDGWICK T. FRY
BY
*Edward M. Farrell*
ATTORNEY Sept. 16, 1958

S. T. FRY 2,852,628

COMMUTATOR DEVICE

Filed May 29, 1957

INVENTOR.
SEDGWICK T. FRY
BY Edward M. Farrell
ATTORNEY

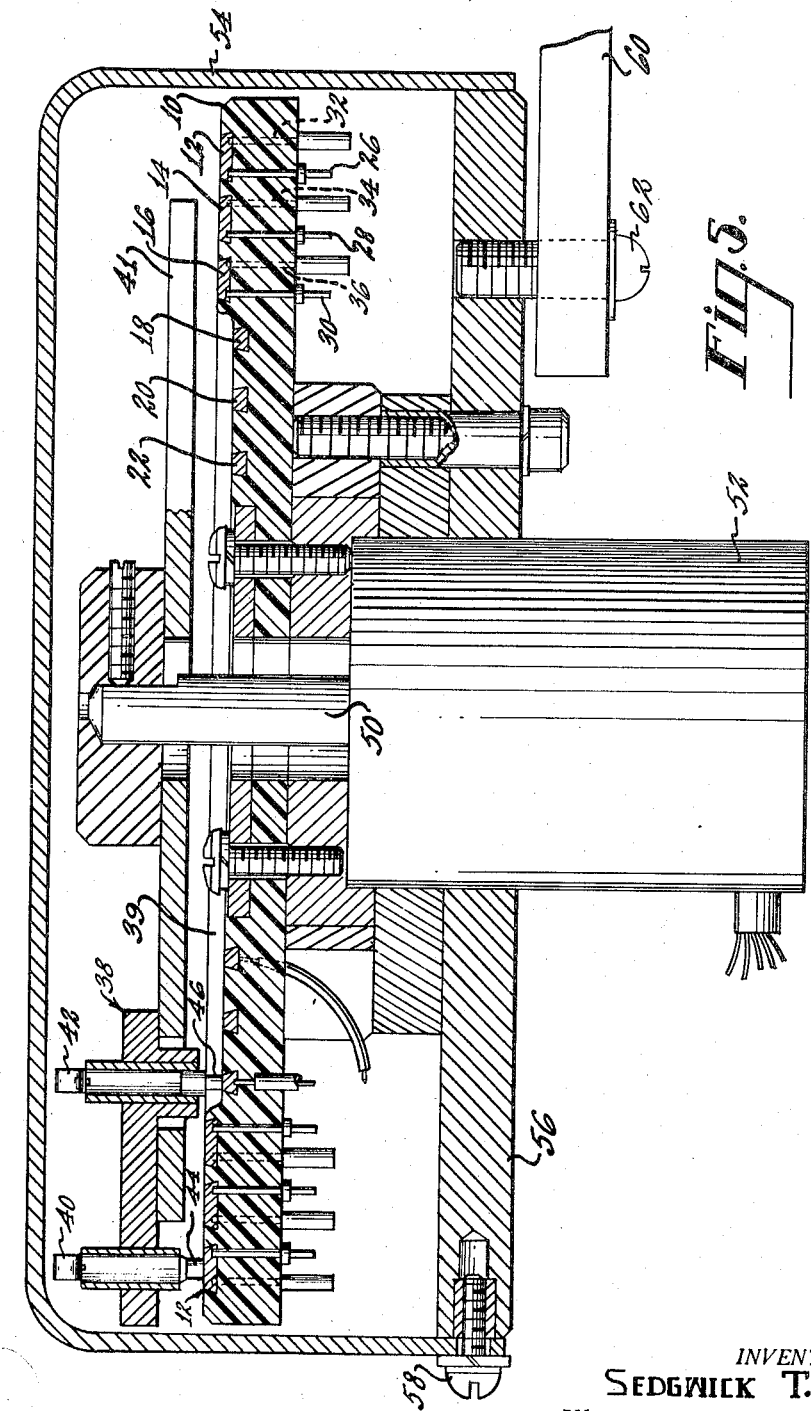

United States Patent Office

2,852,628
Patented Sept. 16, 1958

2,852,628

COMMUTATOR DEVICE

Sedgwick T. Fry, Philadelphia, Pa., assignor to Tele-Dynamics Inc., a corporation of Pennsylvania Application May 29, 1957, Serial No. 662,513

4 Claims. (Cl. 200—24)

This invention relates to mechanical switching devices or commutators, and more particularly to such devices having a large number of contacts and suitable for high speed operation.

In many types of telemetering systems, it is often necessary to measure a large number of variable quantities. For example, when a telemetering system is employed in a guided missile, pilotless aircraft or a projectile, recordation or measurement of acceleration, temperature, pressure, current and numerous other functions are often necessary. Such a telemetering system generally inludes transducers which convert each variable quantity to be measured into a corresponding electrical signal. The electrical signals from the transducers may then be used to modulate subcarrier oscillators. The output signal from the subcarrier oscillators may, in turn, modulate the carrier signal of a high frequency transmitter. A carrier signal transmitted from the transmitter in the guided missile, for example, may then be received by a receiving station on the ground or other remote point. Suitable demodulation means are employed to restore the electrical signals originating at the transducers. Since these electrical signals are functions of the variable quantity measured, indications of the character of the measured functions are readily attainable.

In order to utilize available bandwidth to its greatest extent, especially in telemetering where the amount of desired information is great and the available bandwidth is relatively small, it is desirable to use multiplexing circuits. The use of multiplexing circuits permits the use of so-called frequency division methods to impress a number of information signals upon a single carrier signal.

It is also desirable to utilize time division methods in order to make maximum use of the available bandwidth. A time division system may utilize a single sub-carrier oscillator associated with a plurality of transducers with the electrical outputs from the transducers periodically sampled. This method permits a maximum amount of information utilizing a single sub-carrier frequency. In carrying out such time division methods, mechanical switching devices or commutators are often used since they are relatively simple and offer a maximum amount of reliability.

As the art of telemetering and guided missiles has developed, the requirements for more and more information within the given bandwidth and with minimum space requirements have increased. Also, it is important that in providing this information within a minimum amount of space, reliability is not sacrificed.

With the advent of a large number of guided missile programs, saving of manufacturing time and cost in telemetering devices have become increasingly more important.

Among the major problems encountered in commutators used in measuring systems have been in connection with brush arrangements and brush wear. Generally, as a brush associated with a commutator plate becomes worn, the contact resistance varies. Variation of contact resistance often becomes intolerable in the measurements of low level signals. Variations in contact resistance in commutator devices are often accompanied by undesirable noise.

Another cause of variable contact resistance in a commutator which may make a commutator unsuitable for use in systems involving the measurements of low level signals may result from the fact that segments or contacts in a commutator plate may be disposed in slightly different planes. Consequently, as an associated brush member moves from one contact to another, a variable pressure may be exerted by the brush upon the contacts thereby causing the resistance between the brush and the individual contacts to vary.

Another cause of a variable contact resistance resides in the use of circular metallic contaces within the commutator plate. Since rectangular brushes are often used, the degree of friction and contact resistance between the circular contact and the rectangular brush is not uniform, especially as the brush is contacting and leaving a particular contact. Also, when circular contact elements are employed with rectangular brushes in a commutator, uneven wear of the brush results due to the difference in the shapes of the contact elements and brushes thereby reducing the life of the brushes and introducing other undesirable effects within a system.

In designing a telemetering system, the sampling on-off time is often important with the rates or percentage of on-off time necessary to be used in a system being dependent upon the types of signals measured. The on-off time is dependent upon the relative sizes of a brush element and its associated contacts. The calculating of the on-off time ratio between a circular contact and a rectangular brush is sometimes time consuming.

In manufacturing a commutator plate having a very large number of contacts in a limited space, it is important that irregular edges of the contacts not be shorted or be too close to irregular edges of adjacent contacts since this condition may result in interaction between different measured signals thereby introducing inaccuracies into the system.

Another possible cause of measurement inaccuracies in systems involving mechanical commutators results from a depositing of film or other deposits on or between contact rings associated with a commutator plate. Such a film or deposit may result from oxidation, dirt, brush wear, etc. Such a condition in some cases necessitates periodic cleaning of the commutator plate. When such cleaning is required, it is important that the cleaning be accomplished without disturbing the precision phasing or adjustment of associated brush elements.

It is an object of this invention to provide an improved commutator in which a uniform pressure exists between a brush member and associated contacts when such contacts are in different planes.

It is a further object of this invention to provide an improved commutator in which brush wear is relatively uniform.

It is still a further object of this invention to provide an improved commutator having a very large number of contacts with minimum space requirements.

It is still a further object of this invention to provide an improved commutator having relatively constant contact resistance with brush wear.

It is still a further object of this invention to provide an improved commutator in which manufacturing time is minimized.

It is still a further object of this invention to provide an improved commutator wherein on-off ratio may be calculated easily.

It is still a further object of this invention to provide an improved commutator plate having a large number of contact segments wherein interaction between such contact segments is minimized.

It is still a further object of this invention to provide an improved commutator in which a commutator plate may be cleaned without disturbing the positions of associated brush elements.

In accordance with the present invention, a commutator is provided which includes a plate and an associated brush arrangement. The plate includes at least one concentric ring having a plurality of contact segments. The contact segments may be attained by utilizing a double saw cut method in the manufacturing process. The brush arrangement includes a brush and a constant pressure spring. A spider type rotor plate is provided for mounting the constant pressure spring. The constant pressure spring urges the brush into electrical contacts with one of the contact segments during the operation of the commutator.

Other objects and advantages will be apparent and suggest themselves to those skilled in the art to which the present invention is related, from a reading of the following specification in connection with the accompanying drawings, in which:

Figure 1 is a plan view of a commutator plate illustrating the present invention;

Figure 2 is a cross sectional view taken along line 2—2 of Figure 1;

Figure 5 is a view illustrating complete assembly of a commutator plate and brush arrangement, in accordance with the present invention.

Figure 3:
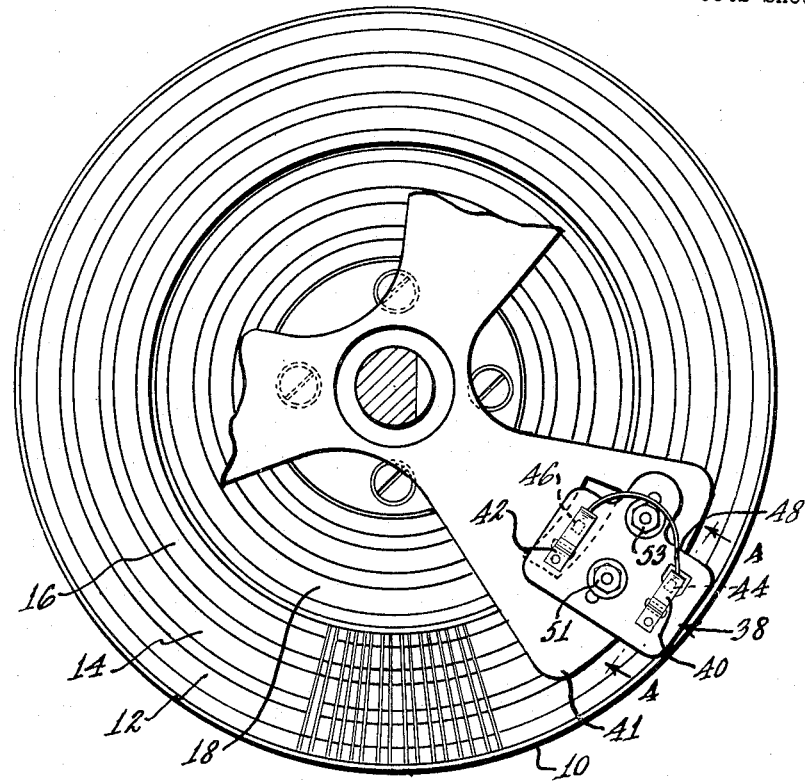
Figure 3 illustrates a commutator plate and an associated brush arrangement, in accordance with the present invention.

Referring particularly to Figures 1 and 2, a commutator plate 10 includes three segmented concentric rings 12, 14 and 16 and three solid concentric solid rings 18, 20 and 22. Although only some of the segments in the concentric rings 12, 14 and 16 are shown, it is understood that the segments are included throughout the entire circumference of the rings. The commutator plate 10 may be of any suitable type of insulating material, such as mica, resin or plastic. The six concentric rings may be of a suitable type of conducting material, such as silver.

Each of the solid rings 18, 20 and 22 may be electrically connected to a conductive element passing through the insulating commutator plate to an electrical circuit. One such conductor 24 connected to the solid ring 18 is shown in Figure 2. Each of the segments of the segmented rings 12, 14 and 15 may also be connected to conductors such as 26, 28 and 30 which extend through the commutator plate 10. The conductors 26, 28 and 30 may be connected to circuits to which information signals from associated transducers or other circuits are applied. Conductors 32, 34 and 36 may be connected to "dead" pins or to ground. Connection of alternate contacts to ground provides a desirable arrangement in many cases. Since the size of the associated brushes must bear a certain relationship to the size of the segmented contacts, dead or grounded pins are sometimes utilized between "live" contacts or those connected to information bearing circuits. A brush will then completely leave one "live" contact before engaging the next "live" contact.

Various methods of manufacturing of plate 10 may be employed. One such method employed has involved first forming a solid plate of a resin compound. The plate is then cut on a machine into a circular shape and machined flat on its two surfaces. A circular aperture 37 is provided in the center of the plate 10 by cutting, drilling or other suitable process. The interior portion of the plate is machined or grooved to provide a recess 39. The recess 39 facilitates the segmenting of the circular rings 12, 14 and 16 during the manufacturing process, as will be seen.

Six circular grooves are then machined or cut into the plate 10 to receive suitable conductive material to provide the circular rings 12, 14, 16, 18, 20 and 22. The sides of these grooves are cut at a slight angle so that the lower portions of the grooves are wider than the upper portions. This arrangement is desirable since the rings once inserted will be held firmly in place and are not likely to be loosened by vibrations or other mechanical shocks sometimes encountered in guided missiles. It is understood that the manufacturing of the plate 10 may involve molding the plate to a suitable size with the appropriate recesses and grooves instead of the manufacturing method described.

Holes are then drilled through the plate. The conductor elements 24, 26, 28, 30, 32, 34 and 36 are then inserted through the holes with the exterior ends of the conductor elements extending slightly within the circular grooves. The grooves may then be coated with an attracting material. Silver or other conductive material may then be deposited within the grooves, by means of an electroplating process. As the silver or other conductive material is deposited within the grooves electrical connections are made between the silver and conductive elements. The face of the plate 10 may then be machined so that the circular rings are even with the upper surfaces of the plates.

The circular rings 12, 14 and 16 are now adapted to be segmented, by sawing across the rings. In forming the commutator plate shown, a double parallel saw was used. Since the inner surface of the plate 10 has a recess 39, the outer rings 12, 14 and 16 may be sawed without affecting or cutting the inner rings 18, 20 and 22. The movement of a saw during the manufacturing process may be completely across the plate to cut the outer rings without cutting the inner rings. It is noted that the double saw cut method of manufacturing and the recessed inner portion of the plate permits a reduction in manufacturing time. The double saw cut method also results in alternate contact segments having parallel sides. This type of segmented contact permits easy calculation of the on-off time of a commutator, since the contacts have substantially the same relative shape as associated brush elements. The use of a saw cut method to form the segmented rings also assures even edges between adjacent contacts thereby reducing the likelihood of interference between different sampled circuits. Irregular edges, such as sometimes result when some printed circuitry techniques are employed, causes interference between the electrical signals from sampled circuits and other undesirable effects.

Figure 4:
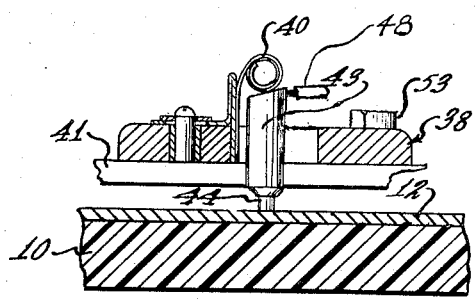
Figure 4 is a cross sectional view taken along lines 4—4 of Figure 3.

Referring particularly to Figures 3 and 4, the commutator plate 10 is shown with an associated rotor plate 41. A brush holder 38 is mechanically mounted on a rotor plate 41. The brush holder 38 has a pair of apertures adapted to receive a pair of brushes 44 and 46. A pair of constant pressure springs 40 and 42 are mounted on the brush holder 38 and positioned to urge the brushes 44 and 46 into electrical engagement with the segmented ring 12 and the solid ring 18, respectively. An element, such as a brush cap 43, may be disposed between the springs and the actual brush element. A conductor or wire 48 is electrically connected between the brushes 44 and 46. The relative position of the brushes 44 and 46 may be varied by loosening a pair of screws 51 and 53, moving the brush holder 38 to the desired position and then tightening the screws. When a plurality of a pair of brushes are associated with a commutator, adjustment of the relative phasing of the brushes is sometimes necessary.

As the brushes 44 and 46 are rotated, different segments on the ring 12 will be electrically connected to the ring 18. Since each alternate segment of the ring 12 may be connected to a different transducer or other electrical circuit, the electrical output from such a transducer or electrical circuit will be sampled periodically as the brushes are rotated. The sampling rate is dependent to a great extent upon the speed at which the brushes 44 and 46 are rotated. A brush holder with a pair of brushes may be included on each of the arms of the rotor plate 41. The rotor plate 41 may also include additional arms dependent upon the system involved.

The constant pressure springs 40 and 42 are of a special type and comprise elastic members which exert a force which does not change as the springs are extended or closed. When uncoiled, the springs 40 and 42 develop resisting forces in their curved portions of the spring material where the straightening action is taking place. The completely straightened material stores the energy when the coil winds or unwinds but adds nothing to the resultant force. Therefore, regardless of the amount of straight material in the spring, the force exerted by the curved portion remains virtually the same.

The performance of the spring shown is possible because each portion of the flat spring material is preset to the same curvature, in such a way that it can be completely straightened without deformation. Such a type of spring is illustrated in a patent issued to Lermont, Patent No. 2,609,192. Such a type of spring has also been described in a bulletin 310N issued by Hunter Spring Company in Lansdale, Pennsylvania.

It may be seen that even if the segments of the ring 12 are in a slightly different parallel plane, that the force exerted by the brush 44 will be the same due to the constant pressure action of the spring 40. The contact resistance between the brush and the segments will be maintained relatively constant. Errors in the measurement of low level electrical signals will therefore be greatly reduced due to this constant contact resistance. Contact noise resulting from varying contact resistance will also be minimized in the arrangement shown. It is further noted that even though the brushes 44 and 46 may be subject to wear, that the contact resistance between the brush and the rings will be maintained constant due to the action of the constant pressure springs 40 and 42.

In many commutator devices, rectangular brush members are employed. When such rectangular brush members contact relatively rectangular contact segments, such as shown, the wear of the brush members is uniform and requires less frequent replacement than when the brush members are employed with circular contact segments. Also, since the brush members engage and leave the contact segments at a uniform rate, the contact resistance during operation is more uniform than when circular contacts are employed with the rectangular brush elements.

The rotor plate 41 comprises a spider type member having three arms upon which brush holders may be mounted. The shape of the rotor plate permits access to the plate 10 for cleaning without the necessity of removing the rotor plate thereby disturbing the phasing or positions of the brushes attached to the brush holders. Readjustment of the brushes is thereby avoided when the plate 10 is cleaned.

Referring particularly to Figure 5, there is illustrated a complete assembly of a commutator which may be employed in a telemetering system.

The comutator plate 10 and its associated brushes 44 and 46 are adapted to be rotated on a shaft 50 as the motor 52 is operated to rotate the rotor plate 41. The complete assembly includes a cover 54 attached to a mounting plate 56 by means of a screw 58 or other suitable fastening means. The complete assembly may be mechanically attached to a frame 60 by means of a screw 62. The frame 60 may be the chassis of an associated dynamotor unit, an airborne transmitting system, a sub-carrier oscillator mounting unit or other suitable surface within a guided missile, for example.

There has thus been provided an improved commutator wherein inaccuracies and noise effects due to varying contact resistance are minimized. Such a variable contact resistance which may result from the shape of the segmented rings, the wear of the brush employed or the location in different planes of the concentric rings is eliminated to a great extent by the constant pressure springs and the shape of the segmented contacts. The shape of the rotor plate permits easy cleaning of the plate without disturbing brush settings.

The shape of the segmented contacts has made calculation of on-off time of the brush members relatively easier since the size relationship between a rectangular brush and a rectangular contact is easily attainable. The shape of the contact segments has also resulted in more uniform wear of the brush members involved. The shape of the segmented contacts, as well as the recessed groove in the plate, has made it possible to cut down on manufacturing time since double saw cut methods may be employed. The double saw cut method of manufacturers facilities the design and manufacture of a commutator having a large number of contact segments within a limited space.

What is claimed is:

1. A commutating device comprising a circular plate member having inner and outer surfaces disposed at different parallel planes, said inner surface providing a recess in said circular plate member, a plurality of continuous concentric rings disposed within said inner surface of said circular plate member, a plurality of segmented concentric contact rings disposed within said outer surface of said circular plate member, the alternate segments of said segmented rings having parallel sides with all of the segments being of substantially the same width, means for connecting said alternate segments to information circuits, a rotor plate disposed parallel and adjacent said circular plate member, a brush arrangement including a plurality of pairs of brushes mechanically mounted to said rotor plate, one of each said pair of brushes being positioned to electrically contact one of said continuous concentric rings and the other of each said pair of brushes being positioned to electrically contact one of said segmented concentric contact rings, said last mentioned brushes being of substantially the same size, a plurality of pairs of constant pressure springs mounted on said rotor plate and positioned to urge each said pair of brushes into electrical engagement with said one continuous concentric ring and said one segmented concentric contact ring, and means for rotating said rotor plate.

2. A commutating device as set forth in claim 1 wherein means are provided for adjusting the relative position of said plurality of pairs of brushes.

3. A commutating device comprising a circular plate member having inner and outer surfaces disposed at different parallel planes, said inner surface providing a recess in said circular plate member, a plurality of continuous concentric rings disposed within said inner surface of said circular plate member, a plurality of segmented concentric contact rings disposed within said outer surface of said circular plate member, alternate contact segments of said segmented contact rings having a pair of parallel sides, all of said alternate contact segments in said plurality of segmented contact rings being of substantially the same width, means for connecting said alternate contact segments to information circuits, a spider shaped rotor plate having a plurality of extended arms, a brush arrangement including a plurality of pairs of brushes mechanically mounted to said rotor plate, one of each said pair of brushes being positioned to electrically contact one of said continuous concentric rings and the other of each said pair of brushes being positioned to electrically contact one of said segmented concentric contact rings, means for varying the relative position of said pair of brushes, a plurality of pairs of constant pressure springs mounted on said rotor plate and positioned to urge said plurality of pairs of brushes into electrical engagement with one of said continuous concentric rings and one of said segmented concentric contact rings, and means for rotating said rotor plate.

4. A commutating device comprising a circular plate member having inner and outer surfaces disposed at different parallel planes, said inner surface providing a recess in said circular plate member, a plurality of continuous concentric rings disposed within said inner surface of said circular plate member, a plurality of segmented concentric contact rings disposed within said outer surface of said circular plate member, alternate contact segments of said segmented contact rings having a pair of parallel sides, all of said alternate contact segments being of substantially the same width, means for connecting said alternate contact segments to information circuits, said segmented contact rings being disposed in grooves in said plate, the sides of said grooves being cut at an angle to firmly hold said segmented contact rings, a spider shaped rotor plate having a plurality of extended arms, a brush arrangement including a plurality of pairs of brushes mechanically mounted to one of said arms of said rotor plate, one of each said pair of brushes being positioned to electrically contact one of said continuous concentric rings and the other of each said pair of brushes being positioned to electrically contact one of said segmented concentric contact rings, means for varying the relative position of said pair of brushes, a plurality of pairs of constant pressure springs mounted on said rotor plate and positioned to urge each said pair of brushes into electrical engagement with one of said continuous concentric rings and one of said segmented concentric contact rings, and means for rotating said rotor plate.

References Cited in the file of this patent

UNITED STATES PATENTS

| | | |
|---|---|---|
| 1,224,542 | Henry | May 1, 1917 |
| 1,786,391 | Grover et al. | Dec. 23, 1930 |
| 1,805,935 | Weathers | May 19, 1931 |
| 2,081,184 | Ross et al. | May 25, 1937 |
| 2,515,768 | Gardiner et al. | July 18, 1950 |
| 2,535,040 | Clark | Dec. 26, 1950 |
| 2,604,502 | Felici | July 22, 1952 |
| 2,634,342 | Baechler et al. | Apr. 7, 1953 |
| 2,695,968 | Welch et al. | Nov. 30, 1954 |
| 2,821,584 | Monack et al. | Jan. 28, 1958 |

FOREIGN PATENTS

| | | |
|---|---|---|
| 315,327 | France | Jan. 17, 1903 |